United States Patent [19]
Keever

[11] Patent Number: 6,006,699
[45] Date of Patent: Dec. 28, 1999

[54] ANIMAL TRAINING DEVICE

[76] Inventor: Janet L. Keever, 2206 E. 16th St., The Dalles, Oreg. 97058

[21] Appl. No.: 09/311,620

[22] Filed: May 13, 1999

[51] Int. Cl.$^6$ .................................................. A01K 27/00
[52] U.S. Cl. ............................................................ 119/795
[58] Field of Search ................................. 119/795, 769, 119/781, 792, 798, 863, 865, 905

[56] References Cited

U.S. PATENT DOCUMENTS

| | | | |
|---|---|---|---|
| 2,275,701 | 3/1942 | Taylor | 119/795 |
| 2,737,154 | 3/1956 | Michonski | 119/795 |
| 4,488,511 | 12/1984 | Grassano | 119/795 |

*Primary Examiner*—Thomas Price
*Attorney, Agent, or Firm*—Ingrid McTaggart

[57] ABSTRACT

An animal training device comprises a flexible leash having a clasp for attachment to an animal's collar and a handle for use by a handler. A rigid member is spring mounted on the leash wherein the spring biases the rigid member away from the clasp in the nominal position. The spring facilitates compression of the spring during movement of the rigid member toward the clasp when the handler forces the rigid member along the leash toward an animal being trained or restrained. In this compressed orientation the rigid member is positioned adjacent the animal such that the animal is restrained from jumping upwardly toward the handler. Upon release of the rigid member by the handler, the spring once again biases the rigid member away from the animal thereby facilitating an amount of flexible leash to extend from the rigid member toward the clasp so as to allow relative freedom of movement of the animal being trained or restrained.

6 Claims, 4 Drawing Sheets

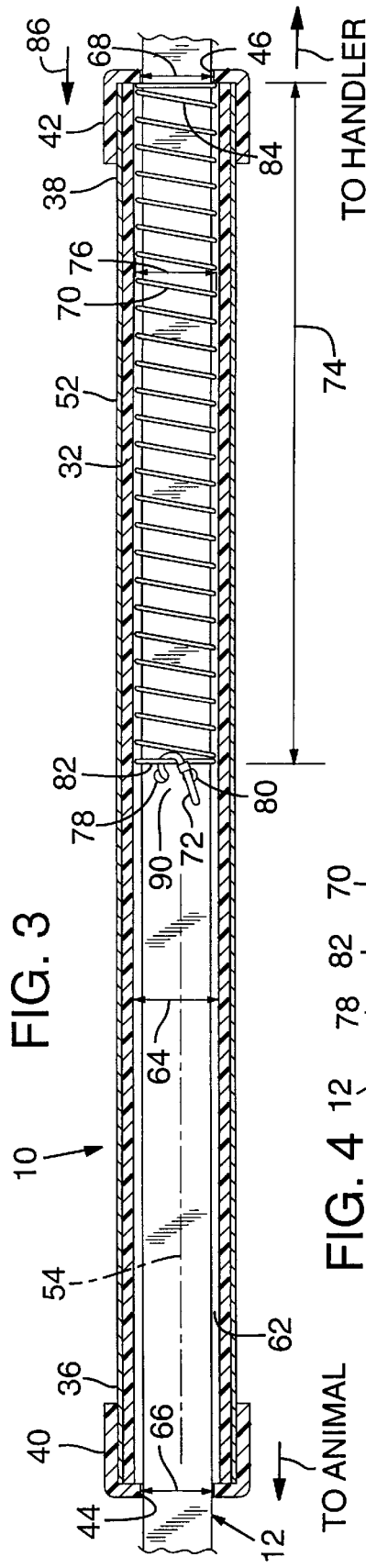
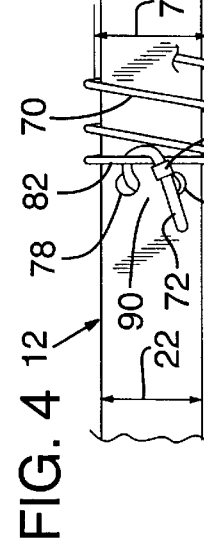
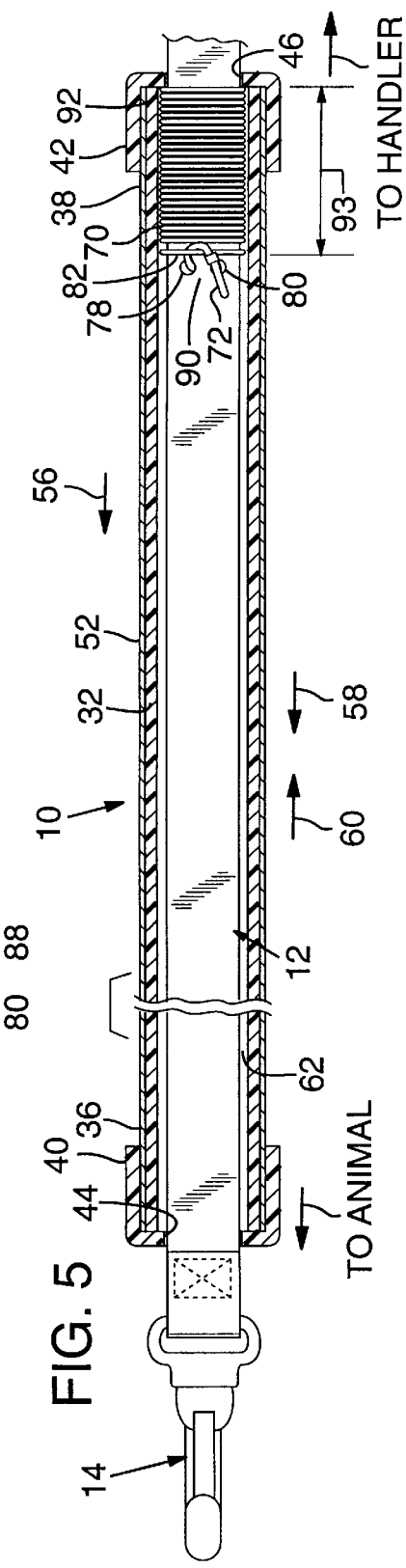

6,006,699

ANIMAL TRAINING DEVICE

TECHNICAL FIELD

The present invention relates to an animal training device, and more particularly, to an animal training device for use in preventing an animal from jumping upwardly toward a handler.

BACKGROUND OF THE INVENTION

For many years domesticated animals have served as companions and work animals. For example, domesticated dogs provide friendship and protection to their owner as well as serving their owners, in some instances, as guide dogs or hearing aid dogs.

In the case of both companion and work animals, the animal must be trained to adhere to acceptable standards of behavior. Specifically, the animal must be trained to obey the commands of sit, stay, lie down, come, and heel. The animal must also be trained not to run away from or jump up onto its handler. By jumping on its handler the animal might knock the handler down, hurt the handler, or dirty the handler's clothes. Training a rambunctious puppy to keep all four paws on the ground, however, can be a difficult and frustrating task.

Several of the above listed commands are easily accomplished with a flexible leash that will not break under tension. In particular, training the animal to adhere to the commands of heel and come, and preventing the animal from running away, can be accomplished with a flexible leash that will not break in response to pulling by the animal. Moreover, a flexible leash is desirable while causally strolling with the animal because the animal is most content when its collar is not under tension and when the animal is allowed some freedom to wander within several feet of its handler.

In contrast, some of the above listed commands are not easily accomplished with a flexible leash but instead require the handler to grab the animal by the collar and physically direct the animal to conduct the command. In particular, during training of the animal not to jump the handler typically is required to bend over toward the animal, grab the animal's collar or harness, and pull or push the animal toward the ground. This places the owner's face within jumping distance of the animal and, ironically, tends to further encourage the animal to jump. Moreover, grasping the collar of a jumping and squirming puppy may be difficult to accomplish.

Accordingly, a flexible leash does not facilitate training an animal not to jump. However, a flexible leash is desired during the remainder of a training session. There is a need, therefore, for an animal training device that allows a handler to train an animal not to jump without requiring placement of the handler's face near the animal, while also providing for the benefits of a flexible leash.

SUMMARY OF THE INVENTION

Accordingly, an object of the present invention is to provide an animal training device that allows a handler to control an animal in a variety of training and command situations.

Another object of the present invention is to provide an animal training device that allows a handler to train an animal not to jump without requiring the handler to bend over toward the animal or place the handler's face near the animal.

Still a further object of the present invention is to provide an animal training device that facilitates control of the animal without requiring the handler to grab the animal's collar or harness as it jumps and squirms around.

Yet another object of the present invention is to provide an animal training device that is relatively inexpensive to manufacture.

A further object of the present invention is to provide an animal training device that requires only one-handed operation in the nominal, at-rest position.

Still another object of the present invention is to provide an animal training device that allows a handler to train an animal not to jump while still providing the benefits of a flexible leash.

Accordingly, the device preferably comprises a flexible leash having at one end a clasp for attachment to an animal's collar or harness and at another end a handle for use by a handler. The leash is spring mounted on a rigid member such that the spring biases the rigid member away from the clasp in the nominal position but allows compression of the spring during movement of the rigid member along the flexible leash toward the clasp and toward the animal being trained or restrained. In this compressed position the rigid member is positioned adjacent the clasp of the flexible leash such that the animal is restrained from moving toward the handler. Upon release of the rigid member by the handler the spring once again biases the rigid member away from the animal thereby allowing a portion of the flexible leash to extend between the rigid member and the clasp. This nominal position provides relative freedom of movement of the animal being trained or restrained.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is a cross sectional view of the animal training device of FIG. 1 showing the device in a nominal state;

FIG. 4 is a detailed cross sectional view of the animal training device of FIG. 1 showing the connection of the biasing member to the flexible leash;

FIG. 5 is a cross sectional view of the animal training device of FIG. 2 showing the device in a compressed state;

DETAILED DESCRIPTION

Figure 1:
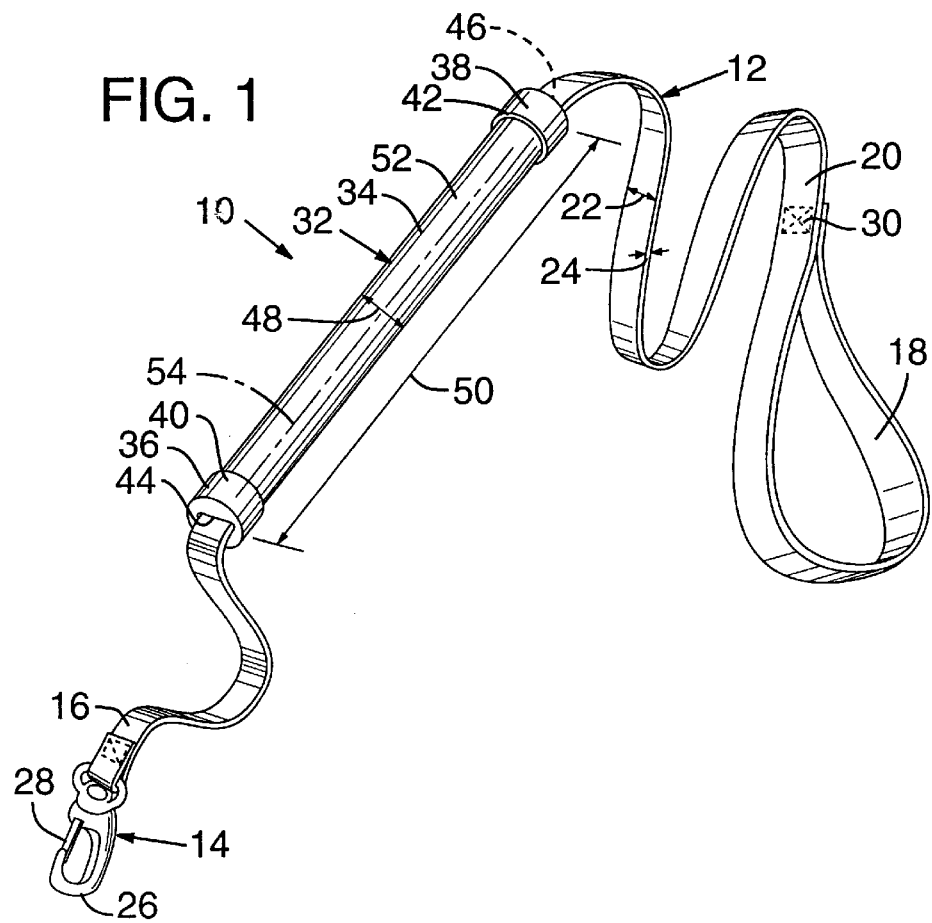
FIG. 1 is a perspective view of the animal training device showing the device in a nominal state.

Referring to FIG. 1, which is a perspective view of the animal training device showing the device in a nominal state, animal training device 10 comprises a flexible leash portion 12 including a clasp 14 at a first end 16 and a handle 18 at a second end 20. Leash 12 may comprise polyester webbing material having a width 22 of approximately ⅝ inch (in) (1.6 centimeters (cm)) and a height 24 of approximately 1/16 in (0.16 cm). Leash 12 may also comprise a rope, a wire, a chain, an elastic cord, or any such material that will withstand the force of tension. The leash typically has a length, measured from clasp 14 to handle 18, of approximately 48 in (120 cm). The leash, however, may be manufactured with any dimensions as is appropriate.

Clasp 14 may comprise any fastening device known in the art for fastening a flexible leash to an animal's collar or harness. In the embodiment shown the clasp comprises a rounded rigid portion 26 having a leaf spring 28 biased thereagainst to retain the clasp ring (not shown) of a standard animal collar. In another embodiment the clasp may comprise a rounded rigid portion and a spring loaded plunger biased to abut the rounded portion so as to retain the clasp ring of a standard animal collar. In still another embodiment the clasp may comprise a looped portion of the leash which functions as a collar when positioned around the animal's neck or torso.

Handle 18 typically comprises a looped portion of the leash sewn to itself at stitches 30. In another embodiment the handle may merely comprise the end of the flexible leash. As will be understood by those skilled in the art, the handle may comprise any known device for grasping an end of the flexible leash by a handler.

Still referring to FIG. 1, device 10 further comprises a rigid body portion 32, also called a baton or a control stick, having an outer wall 34 that defines a hollow interior (not shown in this view), and first and second ends 36 and 38. The first and second ends typically include end caps 40 and 42, respectively, positioned thereon. Each end cap includes an opening 44 and 46, respectively, which encloses the hollow interior of the rigid member. The end caps preferably are manufactured having a rounded end so as to facilitate comfortable grasping of the end cap by the handler. End caps 40 and 42 typically are manufactured as rubber end caps to be placed on the legs of exterior patio furniture. In another embodiment, the end caps may be manufactured of rigid polyvinylchloride, or pvc, and sized to enclose the end of a length of pvc tubing. In still another embodiment the end caps may include a threaded plug which is secured within an interior of the end regions of the rigid member. As will be understood by those skilled in the art, the end caps may be manufactured of any size or material that functions to enclose the hollow interior of the rigid member and which allows the passage of the flexible leash through an aperture in each of the end caps. In another embodiment, wherein the leash is positioned outside and running along the length of the rigid member, the end caps may comprise outwardly extending loops through which the leash is threaded.

The end caps preferably are secured to rigid portion 32 by adhesive or the like such that the end caps will remain on the rigid portion even under substantial force. Accordingly, the end caps typically have an inside diameter that allows snug placement of the end caps over the ends of rigid member 32. In another embodiment the end caps and the rigid member may include corresponding internal and external threads which mate to secure the end caps to the rigid member. The end caps may also be secured to the rigid portion by pins, screws, wire or the like.

Openings 44 and 46 typically are of a shape and a size such that leash 12 will easily extend through the openings. Opening 44 is sized such that clasp 14 will not fit therethrough, and opening 46 is sized such that a biasing member positioned within an interior of the rigid member, as will be described below, will not fit therethrough. Accordingly, the end caps retain the biasing member within the interior of the rigid portion and prevent the clasp from being pulled into the interior region. Flexible leash 12 extends through openings 44 and 46 and through the hollow interior such that rigid portion 32 moves along the leash, as will be described below. Leash 12 may also be described as moving through rigid portion 32 and openings 44 and 46.

Still referring to FIG. 1, in the embodiment shown, rigid portion 32 comprises a hollow cylindrical section of plastic piping, such as polyvinylchloride, or pvc, piping. Rigid portion 32 may be manufactured, however, in any cross sectional shape or of any material. For example, rigid portion 32 may be manufactured from other plastics, wood or metal, and may have an oval, square, or rectangular cross section. In other embodiments the rigid portion may not comprises a solid outer wall but instead may comprise a rigid mesh or grating which is bent into the shape of an elongate member having a hollow interior.

In the embodiment shown, rigid portion 32 has an outer diameter 48 of approximately 1.0 in (2.5 cm) and a length 50 of approximately 17 in (42.5 cm). Rigid portion 32 also includes a decorative covering 52 comprising a sheath of colored material that is wrapped around the outer diameter of the rigid portion along its length. In the preferred embodiment, decorative covering 52 comprises a section of a thin colored plastic sheath that is manufactured as a cover for a standard shower curtain rod. Accordingly, decorative covering 52 allows the device to be sold in virtually any color or decorating scheme while allowing manufacturing of the rigid portion out of inexpensive pvc piping.

Covering 52 typically is secured to the rigid portion by adhesive or the like such that the decorative covering will not twist around an elongate axis 54 of the rigid member or slide off the end of the rigid member. In this embodiment end caps 40 and 42 are secured to the exterior of decorative covering 52. In another embodiment the decorative covering may only cover that portion of rigid member 32 which is not enclosed by end caps 40 and 42 such that the end caps are secured directly to the rigid member.

Still referring to FIG. 1, in the nominal state as shown, flexible leash 12 extends from first end cap 40 to clasp 14 a distance of approximately 9 in (22.5 cm) and flexible leash 12 extends from second end cap 42 to handle 18 a distance of approximately 22 in (55 cm). The length of flexible leash between clasp 14 and rigid portion 32, approximately 9 inches in this example, allows for the comfort and relative freedom of movement of an animal to which the leash is secured. In particular, in this nominal state rigid portion 32 of training device 10 is not positioned adjacent the animal's collar such that the animal does not feel the weight of the rigid member against its neck. In addition, the rigid portion does not restrain the animal's movement such that the animal is free to move in any direction about its handler.

Figure 2:
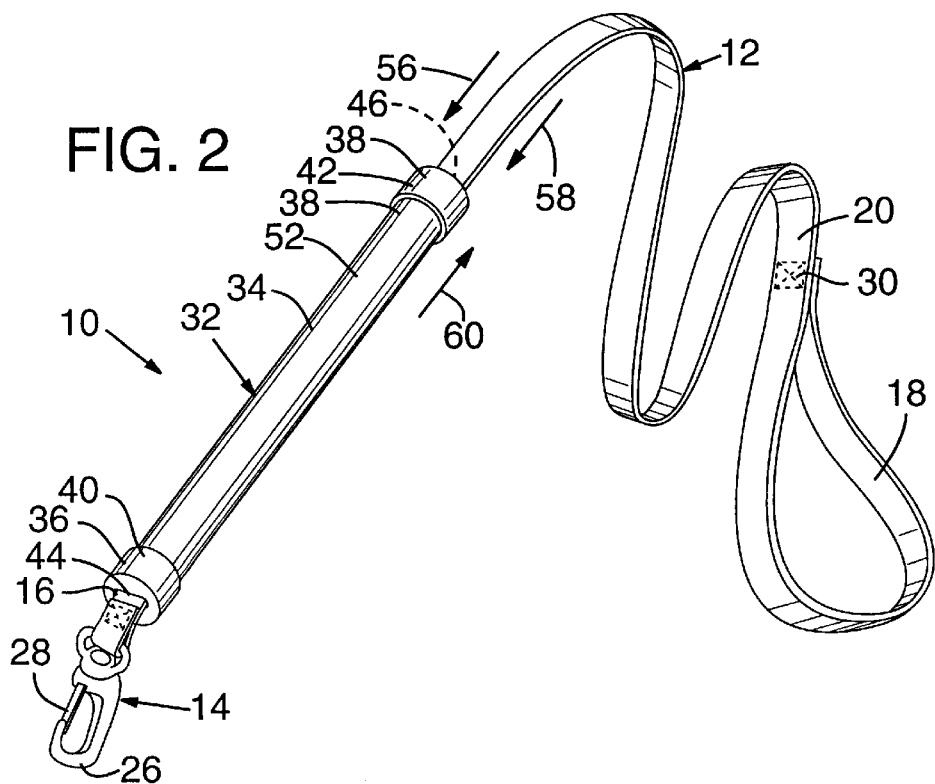
FIG. 2 is a perspective view of the animal training device of FIG. 1 showing the device in a compressed state.

Referring to FIG. 2, which is a perspective view of the animal training device of FIG. 1 showing the device in a compressed state, first end 36 of rigid portion 32 is shown moved along flexible leash 12 in a direction 56 in response to a force applied to the rigid portion in a direction 58 by a handler while the handler holds the flexible leash steady. This position may also be achieved by the handler holding rigid portion 32 steady and pulling flexible leash 12 through the rigid member in a direction 60 toward the handler and away from the animal. Moreover, this position may be achieved by a combination of pulling of leash 12 toward the handler and pushing of rigid member 32 toward the animal being trained or restrained.

In this position, end cap 36 is positioned directly adjacent clasp 14 such that there is virtually no length of flexible leash 12 that extends between end cap 36 of rigid member 32 and clasp 14. Accordingly, by holding the device in this position the handler can ensure that the animal being restrained cannot jump or move toward the handler. Accordingly, rigid member 32 allows the handler to ensure that the animal being restrained cannot come closer to the handler than the length of the rigid member, in this embodiment, approximately 17 inches (42.5 cm). Due to the biasing member retained with rigid portion 32, as will be described below, the handler must maintain a force on the rigid member to retain the end cap 36 of the rigid member adjacent clasp 14. Upon release of the rigid member by the handler, the device will return to its nominal state, as shown in FIG. 1.

Referring to FIG. 3, which is a cross sectional view of the animal training device of FIG. 1 showing the device in a nominal state, rigid portion 32 defines a hollow interior region 62 typically having a diameter 64 of approximately 7/8 in (2.2 cm). Apertures 44 and 46 of end caps 40 and 42 typically are rectangular in shape and have widths 66 and 68, respectively, measured across their widest portion, of approximately 3/4 in (1.9 cm). Leash 12 preferably extends through apertures 44 and 46 and through hollow interior 62 of rigid portion 32. A biasing member 70 is secured to leash 12 by a fastener 72 and is completely contained within hollow region 62 and between end caps 44 and 46. Biasing member 70 typically comprises a standard coil spring having a length 74 of approximately 10 in (25 cm) and a diameter 76 of approximately 7/8 in (2.2 cm) in the nominal position. Accordingly, spring 70 has a diameter larger than apertures 44 and 46 such that the spring is contained with hollow interior 62.

The biasing member may comprise any type of biasing means known in the art, including an elastic cord secured between leash 12 and rigid portion 32. For example, an elastic cord may be secured at an upper end on leash 12 and secured at a lower end to rigid portion 32. Moving rigid portion 32 toward clasp 12 will stretch the cord and place device 10 in the restraint or "compressed" training mode. Release of the rigid portion by the handler will allow the elastic cord to pull rigid member 32 upwardly and away from the animal being trained.

Fastener 72 typically comprises a nylon looped fastener, also known as a "zip tie", that is passed through two side-by-side apertures 78 and 80 in flexible leash 12 and around an end loop 82 of biasing member 70. In another embodiment, the apertures may be positioned along axis 54 of the device or a single aperture may be used. Accordingly, end loop 82 of the biasing member is secured to the leash while the remainder of the coil spring winds around a length of leash 12. The other end 84 of biasing member 70 is not secured to the leash such that the biasing member may be compressed along a length of leash 12 and toward end loop 82 of the biasing member which is secured to the leash. In other embodiments, fastener 72 may comprise stitching or adhesive secured to the leash. The "fastener" may also comprise end loop 82 of the biasing member positioned directly through the leash itself and secured thereon. In other embodiments the fastener may comprise a pin, a threaded bolt with a tightening nut, wire, two metal clamping devices, a pipe strap, a small snapping device, or a rivet. In still another embodiment, a knot could be tied in leash 12 and a washer positioned therearound such that the biasing member abuts the washer and is compressed by the washer as the leash is pulled through the rigid member. In still another embodiment the biasing member may not be positioned around the leash but instead may be positioned next to the leash within interior region 62.

Still referring to FIG. 3, when device 10 is operated by a handler, the handler typically will hold handle 18 in a plane vertically above clasp 14 such that end cap 42 is positioned in a plane above end cap 40. In this position the force of gravity forces end cap 42 downwardly in a direction 86 and against end 84 of biasing member 70. The compression strength of biasing member 70, however, is strong enough to withstand the weight of rigid portion 32 such that member 70 is not compressed. Accordingly, this state defines the nominal, or uncompressed, position wherein rigid portion 32 is suspended on leash 12 approximately 9 inches above clasp 14. The 9 inches of flexible leash extending from rigid portion 32 toward the animal attached to the leash allows the animal relative freedom of movement with respect to the handler.

Referring to FIG. 4, which is a detailed cross sectional view of the animal training device of FIG. 1 showing the connection of the biasing member to the flexible leash, fastener 72 is looped through apertures 78 and 80 and around end loop 82 of spring 70. The fastener is secured to itself at a connection 88 to secure end 82 of the spring to a section 90 of leash 12. Because the spring is manufactured in a size larger than the apertures of the end caps, section 90 of leash 12 is retained within hollow interior 62 of rigid portion 32.

Referring to FIG. 5, which is a cross sectional view of the animal training device of FIG. 2 showing the device in a compressed state, first end 36 of rigid portion 32 is shown moved along flexible leash 12 in direction 56 in response to the force applied to the rigid portion in direction 58 by the handler while the handler holds the flexible leash steady. As described previously, this position may also be achieved by the handler holding rigid portion 32 steady and pulling flexible leash 12 through the rigid member in direction 60 toward the handler and away from the animal. Moreover, this position may be achieved by a combination of pulling of leash 12 toward the handler and the pushing of rigid member 32 toward the animal being trained or restrained.

The force applied by the handler to device 10 is great enough to overcome the compression force of biasing member 70 such that section 90 of leash 12 is moved toward end cap 42 and the biasing member is compressed. The handler continues to apply a force to the device until biasing member 70 is completely compressed against an interior surface 92 of end cap 42. In this position end cap 40 preferably is positioned adjacent and abuts clasp 14 such that the length of flexible leash that extends between clasp 14 and section 90 of the leash is completely contained within hollow interior 62 of rigid portion 32. In this position, spring 70 has a compressed length 93 of approximately 1.0 in (2.5 cm). Accordingly, during the time the handler continues to apply this force to the device to hold the rigid portion against clasp 14, the animal will have no slack section of flexible leash adjacent it's collar and, therefore, is restrained against movement toward the handler. Moreover, when the handler directs first end 36 of rigid portion 32 toward the ground while applying a force to maintain end cap 40 adjacent clasp 14, the handler can force the animal's collar, and thereby force the animal's head and neck toward the ground. In this manner the handler can ensure that the animal does not jump up on the handler and also allows the handler to train the animal to lie down on command. Accordingly, the present invention allows a handler to prevent an animal from jumping upwardly toward the handler, and allows the handler to force the animal to the ground, without requiring the handler to bend over toward the animal, place the handler's face near the jumping animal or attempt to grasp the collar or harness of a squirming animal.

Figure 6:
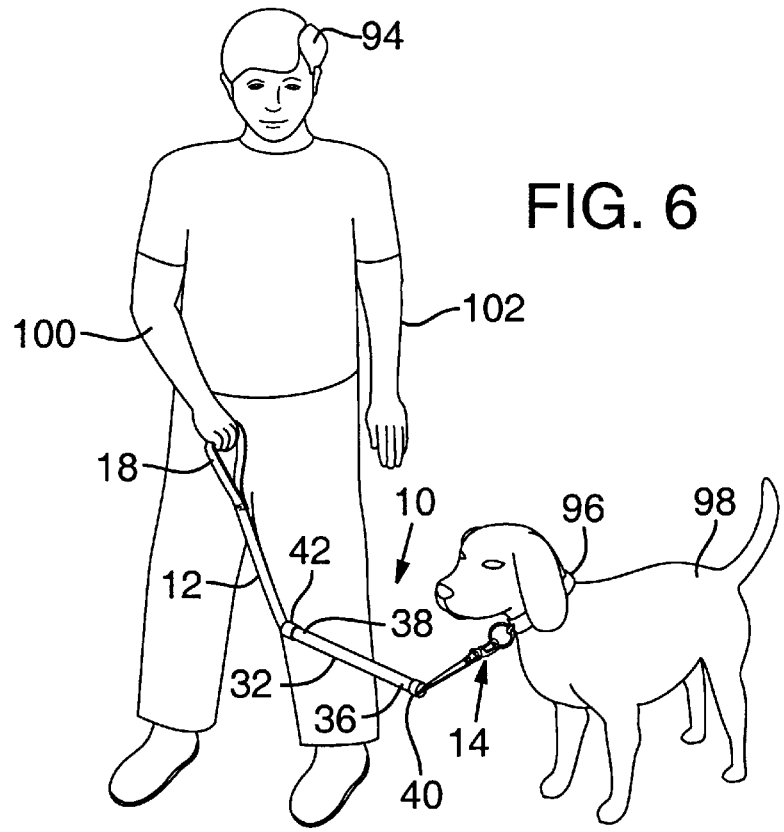
FIG. 6 is a schematic environmental view of the animal training device in use with an animal wherein the device is in a nominal state.

Referring to FIG. 6, which is a schematic environmental view of the animal training device in use with an animal wherein the device is in a nominal state, a handler 94 is shown holding handle 18 of device 10 which is secured by clasp 14 to a collar 96 of a dog 98. In this position the handler is not applying a force to rigid portion 32 such that the rigid portion is merely suspended on leash 12 approximately 9 inches from clasp 14. Accordingly, dog 98 has the sensation of being secured by a typical flexible leash in that the dog has relative freedom of movement with respect to handler 94. Moreover, rigid portion 32 is not positioned adjacent collar 96 such that the dog does not feel the rigid portion against its neck. In this orientation the dog may jump upwardly toward the handler whereupon the handler may apply a force to the device to position baton 32 in the compressed state and thereby restrain the dog.

Figure 7:
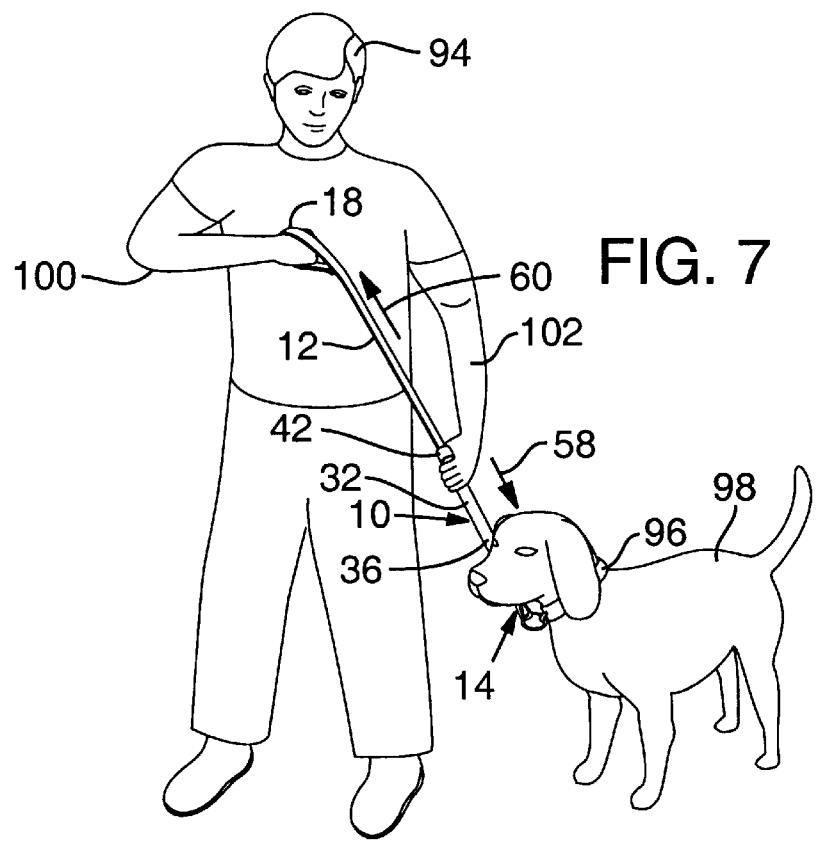
FIG. 7 is a schematic environmental view of the animal training device in use with an animal wherein the device is in a compressed state.

Referring to FIG. 7, which is a schematic environmental view of the animal training device in use with an animal wherein the device is in a compressed state, handler 94 is shown applying a combination of forces to device 10. In particular, handler 94 is shown pulling leash 12 with his right hand 100 in direction 60 toward the handler and pushing rigid portion 32 with his left hand 102 downwardly in direction 58 toward dog 98. This combination of forces applied to device 10 positions end cap 40 adjacent clasp 14 and collar 96 of dog 98. Furthermore, handler 94 is shown directing first end 36 of baton 32 toward the ground thereby further inhibiting jumping by dog 98. During the time period handler 94 retains these forces on device 10, the device will continue to function to restrain dog 98 against jumping. Once handler 94 releases either baton 32 or leash 12, spring 70 will return to its uncompressed, nominal state such that a portion of flexible leash 12 will extend between the baton and the animal's collar. The handler typically will release the force on the baton and will lower handle 18 toward the dog to return the device to its nominal position.

As will be understood by those skilled in the art, device 10 may be used in situations other than training an animal not to jump on its handler. For example, device 10 may be used in crowded situations, such as crowded city sidewalks, busy city crosswalks, or at sporting events, wherein handler 94 may wish to ensure that dog 98 is positioned directly adjacent the handler. The device may also be used by a handler to teach an animal the commands "down" and "heel" or to teach an animal the sequence of steps in an obedience training obstacle course.

Figure 8:
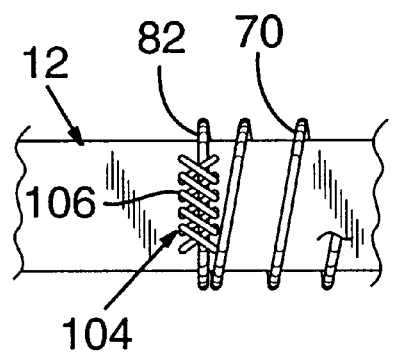
FIG. 8 shows another embodiment of the fastening device for fastening the biasing member to the flexible leash.

Referring to FIG. 8, which shows another embodiment of the fastening device for fastening the biasing member to the flexible leash, fastening device 104 comprises stitching 106 wherein end loop 82 of biasing member 70 is sewn directly to leash 12. Stitching 106 must be strong enough to withstand the forces applied to device 10 by handler 94 and animal 98.

As will be understood by those skilled in the art, biasing member 70 is first secured to leash 12, after which leash 12 and biasing member 70 are threaded through rigid portion 32 and into hollow region 62. Decorative covering 52 and end caps 40 and 42 are then secured to baton 32. Handle 18 is then created by sewing a portion of leash 12 to itself at end 20. Clasp 14 is then attached to end 16 of the leash.

Figure 9:
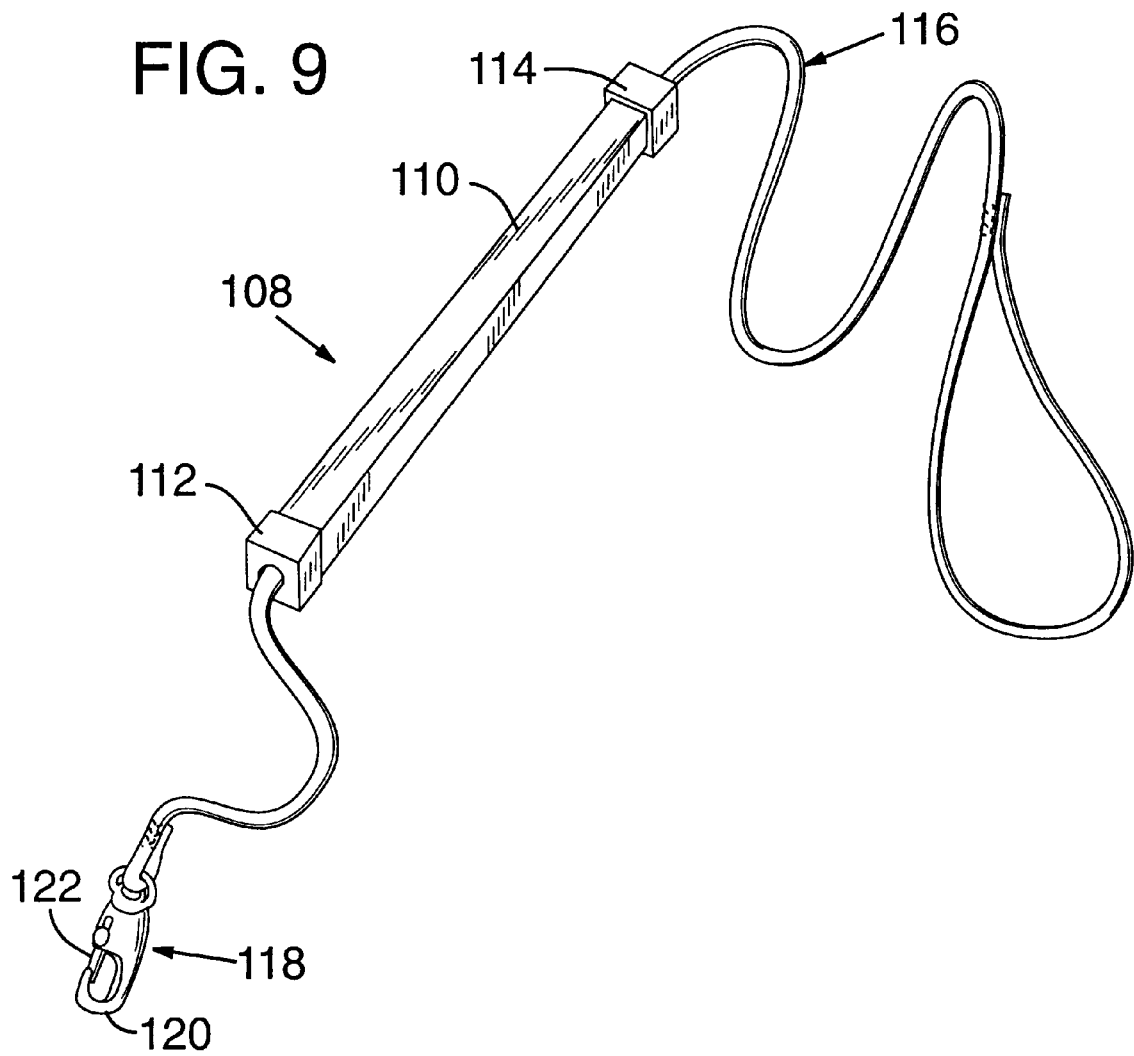
FIG. 9 shows another embodiment of the animal training device.

Referring to FIG. 9, which shows another embodiment of the animal training device, device 108 comprises a rigid body portion 110 having a generally square shaped cross section and having corresponding square shaped end caps 112 and 114. A flexible leash 116 comprises a round rope that extends through body portion 110 and includes a biasing member secured thereto and positioned within rigid body portion 110. A clasp 118 comprises a rigid rounded portion 120 including a spring-loaded plunger section 122 as known in the art. As will be understood by those skilled in the art, device 108 functions in much the same way as device 10 described above. Accordingly, the animal training device of the present invention can be manufactured in any size or shape so as to facilitate positioning of a rigid portion of the device along a flexible leash and adjacent the collar or harness of an animal being trained.

While preferred embodiments of the present invention have been shown and described, it will be apparent to those skilled in the art that many changes and modifications may be made without departing from the invention in its broader aspects. The appended claims are intended to cover, therefore, all such changes and modifications as fall within the true spirit and scope of the invention.

I claim:

1. An animal training device comprising:

a flexible leash having a length and including a clasp for attachment of the flexible leash to an animal;

a control stick connected to said flexible leash and movable along said flexible leash; and a biasing member that biases a predetermined length of said flexible leash to extend outwardly from said control stick toward the clasp when said biasing member is in a nominal position.

2. The animal training device of claim 1 wherein said control stick is elongate and said flexible leash extends through said control stick.

3. The animal training device of claim 1 wherein said biasing member comprises a compression spring contained within a hollow interior of said control stick.

4. The animal training device of claim 1 wherein said control stick includes first and second end caps and wherein said flexible leash extends through said first and second end caps.

5. The animal training device of claim 1 wherein said control stick is adapted for movement along said flexible leash and toward said clasp upon application of an external force to said control stick in a direction toward said clasp so as to compress said biasing member.

6. The animal training device of claim 1 wherein said biasing member is moved from a nominal state to a training state when an external force is applied to the device so as to provide relative movement of the control stick toward said clasp.

* * * * *